Jan. 7, 1941.   L. L. SIZELOVE   2,227,799
TANDEM ATTACHMENT FOR BICYCLES
Filed July 5, 1940    3 Sheets-Sheet 1
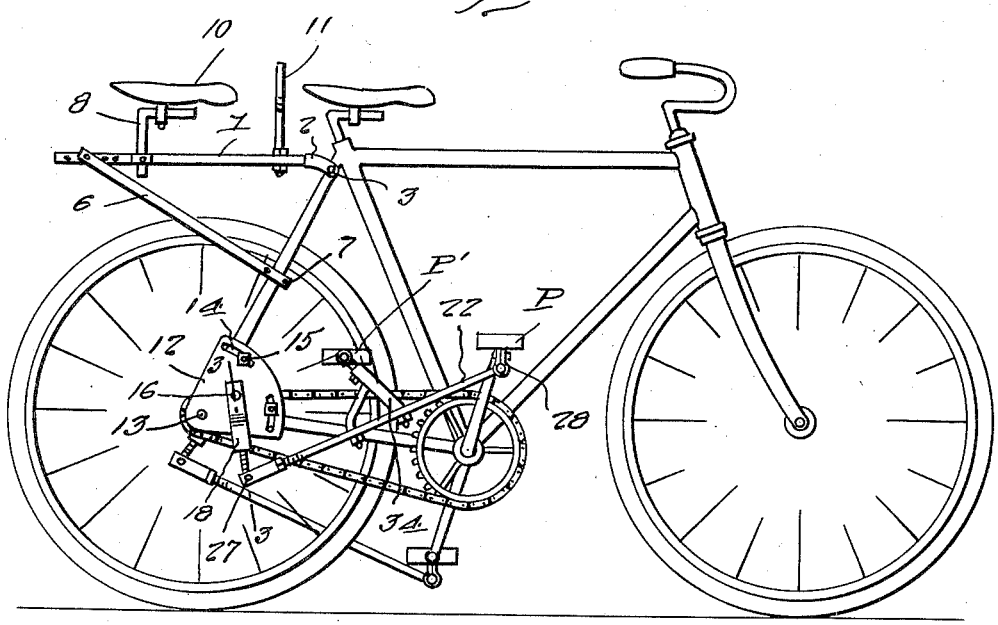
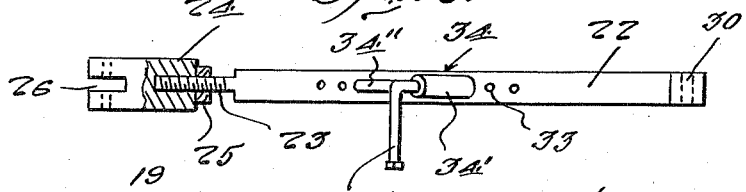
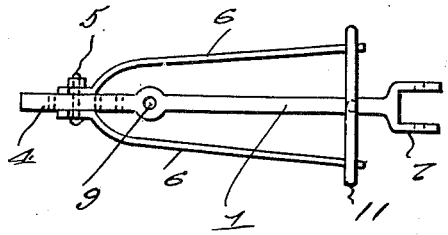
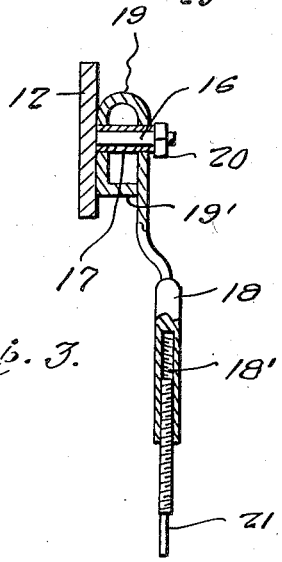
Inventor
LOREN LUTHER SIZELOVE
By Clarence A. O'Brien
Attorney

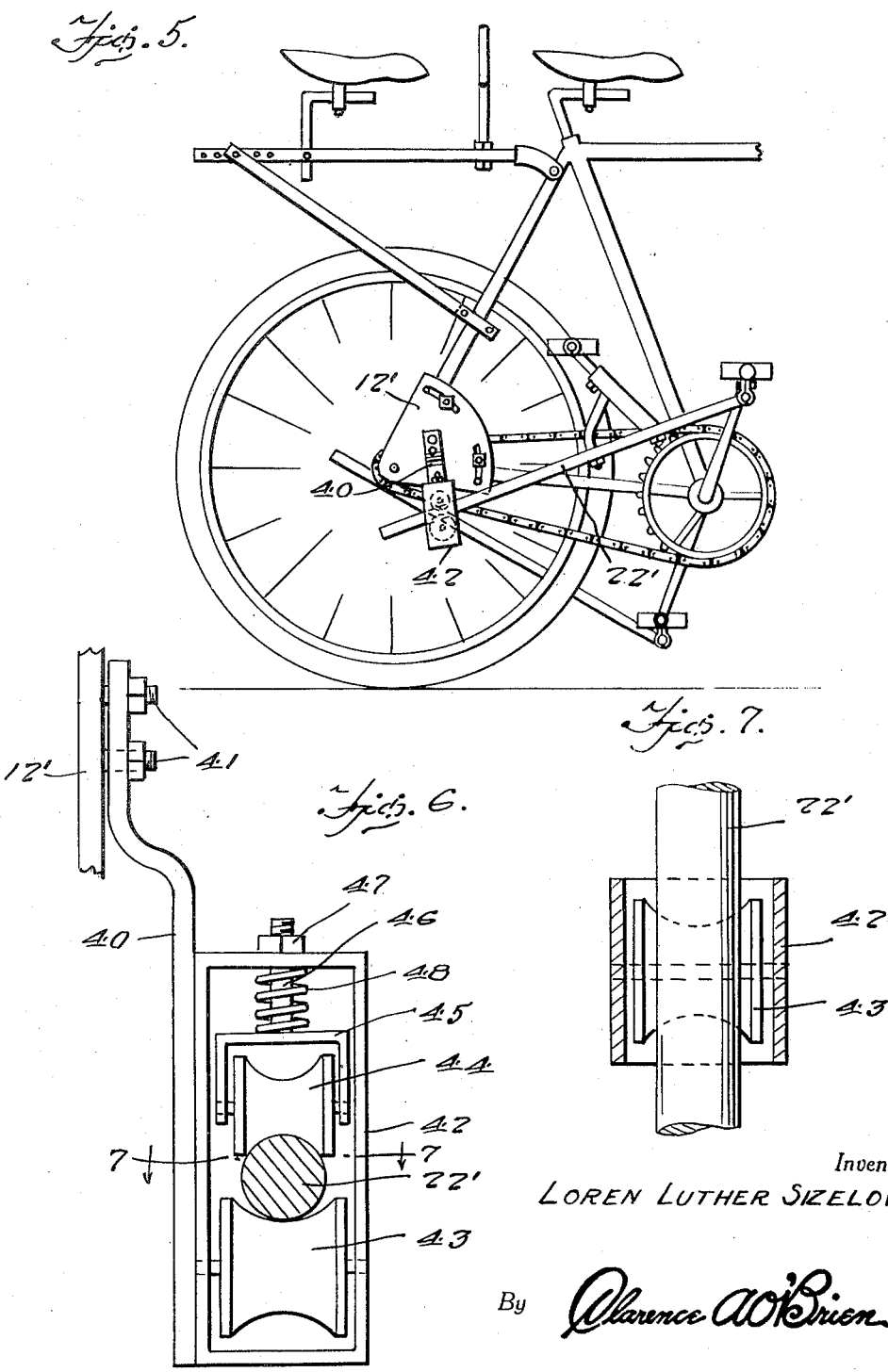

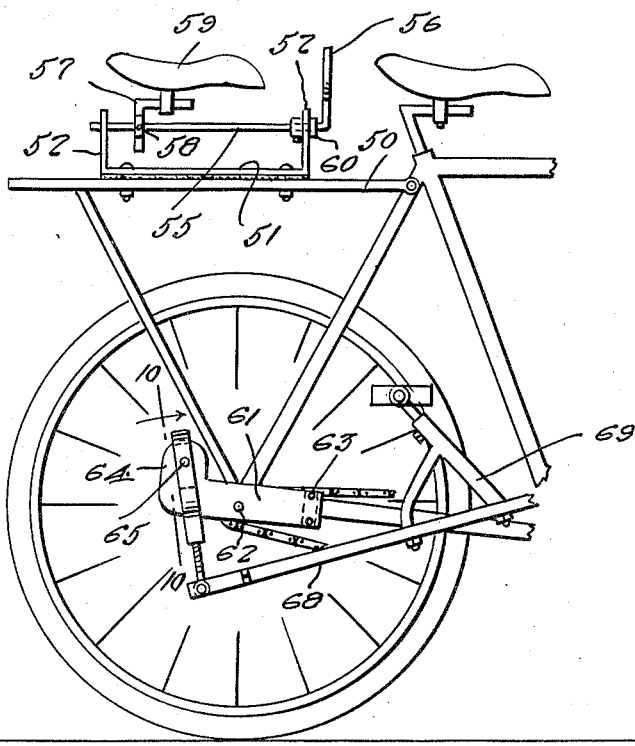
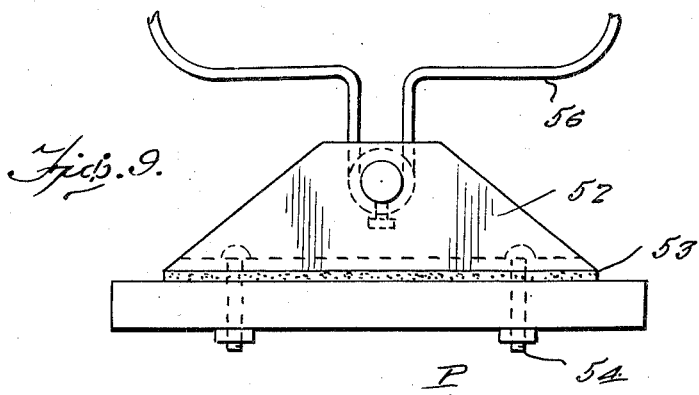
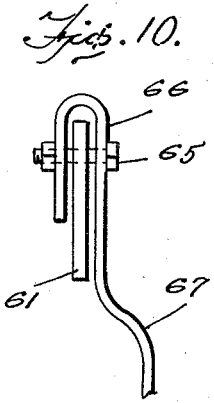
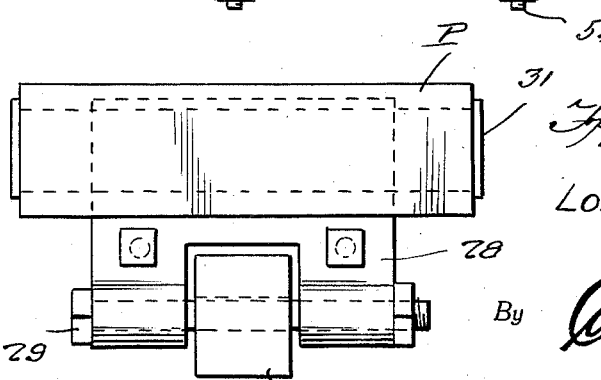

Patented Jan. 7, 1941

2,227,799

UNITED STATES PATENT OFFICE 2,227,799

TANDEM ATTACHMENT FOR BICYCLES

Loren Luther Sizelove, Oxford, Ohio

Application July 5, 1940, Serial No. 344,177

6 Claims. (Cl. 280—7.16)

This invention relates to an attachment for bicycles, the general object of the invention being to provide an additional seat for the bicycle and means whereby the occupant of said additional seat can help propel the bicycle through means of a pedal attachment supported from the bicycle frame.

Another object of the invention is to so form the parts that they can be easily connected to the bicycle or removed therefrom as desired.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is an elevational view of a bicycle provided with the invention.

Figure 2 is a view partly in section of the pedal carrying oscillating bar of the attachment.

Figure 3 is a section on the line 3—3 of Figure 1.

Figure 4 is a top plan view of the seat supporting member of the attachment.

Figure 5 is a fragmentary elevational view showing a modification of the invention.

Figure 6 is an end view of the means for supporting the oscillating bar with the bar in section.

Figure 7 is a section on approximately the line 7—7 of Figure 6 but showing the rod in plan.

Figure 8 is a fragmentary elevational view showing another modification of the invention.

Figure 9 is a front view of the parts carried by the rigid carrier of the bicycle shown in Figure 8.

Figure 10 is a view on the line 10—10 of Figure 8.

Figure 11 is a view showing how the oscillating bar is connected to a pedal of the bicycle.

Referring to Figures 1, 2, 3 and 4 the numeral 1 indicates a seat supporting bar having a forked front end 2 which is pivoted to the rear portion of the frame of the bicycle as shown at 3 in Figure 1. The rear part of the bar 1 is formed with a row of holes 4 for receiving a bolt 5 which connects the rear ends of the pair of brace bars 6 to said rear end of the bar 1, it being understood that by providing this row of holes the brace bars can be adjustably connected with the rear end of the bar 1 in accordance with the type of bicycle on which the invention is used. The lower and front ends of these bars 6 are connected by clamps 7 to the pair of downwardly and rearwardly extending parts of the frame of the bicycle as shown in Figure 1. A seat carrying member 8 is fastened in a hole 9 in the rear portion of the bar 1 so that the seat 10 forms a rear seat for an additional rider. The front end of the bar 1 has a hole therein for receiving the handle member 11 for the occupant of the seat 10, this handle member being of any suitable construction.

A pair of segmental plates 12 is provided, one for each side of the rear wheel of the bicycle. Each of these plates has a hole 13 therein for receiving an end of the rear hub of the rear wheel and each plate has the arcuate slots 14 therein through which pass the limbs of U-shaped clamp 15 which engage the rear bars of the bicycle frame as shown in Figure 1 so as to hold the plates 12 in place. By providing the slots 14 the clamps can be adjusted to suit the bars of different sizes of bicycles. A pin 16 projects outwardly from each plate 12, see Figure 3, and a sleeve 17 fits over the pin. A hanger bar 18 has a loop 19 formed at its upper end, the limbs of the loop having holes therein through which the sleeve 17 passes with the parts being held on the pin by the nut 20 engaging the threaded end of the pin. Thus the hanger bar can rock on the plates and in order to strengthen the parts the end 19' of the short limb of the loop is bent at right angles to engage the other limb as shown in Figure 3. The lower end of the hanger bar 18 is formed to provide a socketed member, the socket 18' of which is threaded to receive the screw-threaded upper portion of a rod 21 having a lower flattened end which is perforated. A pedal carrying bar 22 has its rear end reduced and threaded as at 23 and this threaded part fits in a member 24 which has a threaded hole at one end thereof for receiving the threaded part. A nut 25 holds the parts in adjusted position. The rear end of this member 24 has a slot therein as shown at 26 to receive the flattened end of the bar 21 and this flattened end is held in the slot by a pin 27. The other end of the pedal carrying part 22 is fastened to a pedal P of the bicycle by a two-part clamping member 28, see Figure 11, which clamps a bolt 29 at its lower end and this bolt passes through a hole 30 in the front end of the bar 22 and the clamp engages the central member 31 of the pedal P with the clamp depending from the pedal as shown in Figures 1 and 11.

The bar 22 has a longitudinally extending row of holes 33 therein for adjustably fastening a pedal supporting member 34 on the bar. This member is formed with a front part 34' and a rear part 34", these parts having depending portions threaded and extending through any one of a pair of the holes 33 with nuts for holding the parts in position. The part 34' slopes upwardly and rearwardly and has an outwardly extending portion 35 thereon for receiving a pedal P'.

The parts are so arranged that the occupant of the seat 10 can engage the pedals P' with his feet so that by working these pedals the bars 22 are oscillated on the pivots 27 and 16 so that the oscillating movement of the bars 22 will help to rotate the pedal assembly of the bicycle while it is being operated by the rider on the bicycle proper. Thus it will be seen that this attachment makes the bicycle a tandem one as both drivers can drive the bicycle under their combined efforts. It will also be seen that the parts can be adjusted to suit the size of the rear rider.

Figures 5, 6 and 7 show a modification of the means for connecting the oscillating bars 22' with the plates 12'. As shown in these figures the member 40 which depends from each plate 12' and is fastened to the plate by bolts 41, has a box-like part 42 attached to its lower part with its front and rear sides open. A lower grooved roller 43 is journaled in the box-like member and a second grooved roller 44 is carried by a yoke 45 having a stem 46 attached to its upper part, the stem passing through the top of the box 42 and this part is threaded to receive a nut 47. A spring 48 encircles the stem and bears against the top of the box member 42 and the yoke and tends to force the yoke downwardly. The rear portion of the bar 22', at least, is of circular shape in cross section and passes between the two grooved rollers 43 and 44 so that it can be moved back and forth during the pedaling action.

In other respects this form of the invention is the same as that first described though the hanger 40 is stationary.

Figures 8, 9 and 10 show another modification in which the extra seat is supported by the luggage carrier 50 of the bicycle and as shown in these views I provide a flat plate-like member 51 with its ends turned upwardly as at 52 and a strip of rubber 53 or the like is placed between this member 51 and the upper face of the luggage carrier. The parts are connected to the luggage carrier by the bolts 54. The seat carrying rod 55 passes through the upturned ends 52 and said rod at its front end carries the upwardly extending handle bars 56 and the seat supporting member 57 may be adjustably connected to the rear part of the bar 55 as shown at 58, the seat being shown at 59. Nuts 60 on the bar engaging one of the upturned ends 52 hold the bar in position.

These figures also show an elongated plate-like member 61 having a hole at substantially its middle portion for receiving an end of the hub 62 with a clamp 63 for connecting the front end of the plate to a frame of the bicycle, the rear end of the plate having an upstanding part 64 through which a bolt 65 passes, this bolt also passing through the limbs of an inverted U-shaped part 66 at the upper end of a hanger member 67 to which the rear end of the oscillating bar 68 is connected. This arrangement permits the oscillating bars to be made longer and to so arrange the pedal supports 69 that the pedaling actions of the rear rider will not interfere with those of the front driver.

As will be understood all the parts can be made adjustable so that they can be applied to bicycles of different types and sizes and also for use by persons of different sizes.

The seat of all forms of the invention may be clamped directly to the bar 1 or bar 55 and the hanger 40 in Figures 5 and 6 should be stationary and it may be directly connected to the hub bolt of the rear wheel. The bend in the intermediate part of each oscillating hanger is for the purpose of giving clearance for the rear wheel and its pivoted stand and to space the extra pedal from the bicycle frame. This also aligns the extra pedal with the bicycle pedal.

The oscillating hangers must be longer than the hangers to which the regular pedals are connected so as to prevent dead centers.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An attachment for a bicycle comprising a member for attachment to the rear part of the bicycle above the rear wheel, a seat and handle bars carried by said member, a pair of plates arranged one at each side of the rear wheel of the bicycle, means for connecting the plates to parts of the bicycle, hanger members depending from the plates, a bar connected to the lower end of each hanger member, means for connecting the front ends of said bars to the pedals of the bicycle, supporting members on intermediate parts of the bars and pedals carried by the supporting members and adapted to be engaged by the feet of the rider sitting on the seat.

2. An attachment for a bicycle comprising a member for attachment to the rear part of the bicycle above the rear wheel, a seat and handle bars carried by said member, a pair of plates arranged one at each side of the rear wheel of the bicycle, means for connecting the plates to parts of the bicycle, hanger members depending from the plates, a bar connected to the lower end of each hanger member, means for connecting the front ends of said bars to the pedals of the bicycle, upright members on the bars and pedals carried by the upright members and adapted to be engaged by the feet of the rider sitting on the seat, means for adjusting the seat on its supporting member and means for adjusting the pedal supporting means on the bar.

3. An attachment for a bicycle comprising a member connected with the rear of the bicycle and arranged above the rear wheel thereof, a seat and handle bars carried by the member, bars connected with the pedals of the bicycle at the front, pedal supporting means connected with the bars intermediate their ends, a pair of hanger members, means for supporting the same from the rear wheel carrying part of the bicycle frame, said hanger members each including a small frame, grooved rollers in the frame through which the rear ends of the pedal carrying bars pass and means for exerting pressure on the upper roller.

4. An attachment for a bicycle comprising a seat and handle bar supporting member connected with the rear portion of the bicycle above the rear wheel thereof, a pair of bars connected at the front ends with the pedals of the bicycle, pedal supporting means connected with the intermediate part of the bars, a pair of plates having holes in intermediate portions for receiving the ends of the hub of the rear wheel of the bicycle, means for connecting the plates to a part of the bicycle frame, each plate having an upward extension at its rear end and hangers pivoted to said extensions and pivotally connected at their lower ends to the rear ends of the pedal carrying bars.

5. An attachment for a bicycle comprising a seat and handle bar supporting member connected with the rear portion of the bicycle above the rear wheel thereof, a pair of bars connected at the front ends with the pedals of the bicycle, pedal supporting means connected with the intermediate part of the bars, a pair of plates having holes in intermediate portions for receiving the ends of the hub of the rear wheel of the bicycle, means for connecting the plates to a part of the bicycle frame, each plate having an upward extension at its rear end and hangers pivoted to said extensions and pivotally connected at their lower ends to the rear ends of the pedal carrying bars, and means for adjusting the length of the hangers.

6. An attachment for a bicycle comprising a seat and handle bar carrying member attached to the rear part of the bicycle and located above the rear wheel, plates having holes therein for receiving the ends of the rear hub of the bicycle, means for adjustably connecting the plates to portions of the bicycle frame, hangers pivoted at their upper ends to the plates, said hangers adjustable as to the length, a pair of bars connected at the rear ends to the lower ends of the hangers, clamps for connecting the front edges of the bars to the pedals of the bicycle and pedal carrying members connected to intermediate portions of the bars.

LOREN LUTHER SIZELOVE.